US 6,604,878 B1
(12) United States Patent
Wong

(10) Patent No.: US 6,604,878 B1
(45) Date of Patent: Aug. 12, 2003

(54) KEYBOARD INPUT DEVICES, METHODS AND SYSTEMS

(75) Inventor: Constant Tsai Shi Wong, Melbourne (AU)

(73) Assignee: EasyKeys Limited, Central (HK)

( * ) Notice: Subject to any disclaimer, the term of this patent is extended or adjusted under 35 U.S.C. 154(b) by 0 days.

(21) Appl. No.: 09/807,929

(22) PCT Filed: Oct. 21, 1999

(86) PCT No.: PCT/AU99/00899

§ 371 (c)(1),
(2), (4) Date: Jun. 25, 2001

(87) PCT Pub. No.: WO00/25197

PCT Pub. Date: May 4, 2000

(30) Foreign Application Priority Data

Oct. 22, 1998 (AU) .............................................. PP6653

(51) Int. Cl.⁷ .................................................. B41J 5/08
(52) U.S. Cl. ....................................... 400/484; 400/110
(58) Field of Search ................................. 400/484, 109, 400/110; 341/28; 345/171; 707/535

(56) References Cited

U.S. PATENT DOCUMENTS 4,327,421 A * 4/1982 Wang ........................... 400/110
4,379,288 A * 4/1983 Leung et al. ................... 341/28
4,559,615 A * 12/1985 Goo et al. ...................... 178/30
4,669,901 A * 6/1987 Feng ............................ 400/110
5,212,769 A * 5/1993 Pong ............................ 345/467

FOREIGN PATENT DOCUMENTS

| GB | 2221780 A | * | 2/1990 | .............. G06F/3/02 |
| GB | 2259386 A | * | 3/1993 | ........... H03M/11/00 |
| GB | 2313688 A | * | 12/1997 | ........... H03M/11/00 |

* cited by examiner

Primary Examiner—Stephen R. Funk
Assistant Examiner—Minh Chau
(74) Attorney, Agent, or Firm—Barnes & Thornburg

(57) ABSTRACT

A keyboard and method for inputting graphical indicium representations of language characters formed from one or a combination of character units. The keyboard includes a plurality of keys, each key having at least one unit associated therewith but with selected keys, at least, having two or more units associated therewith. Included also is a key mapping for each key whereby selection of a key generates a mapped value of a unit associated with the selected key, the mapped value having a relational correlation with one or more relevant characters. The keys are so arranged on the keyboard that visually similar units are associated with the same or adjacent keys, and units which usually form left, right, top or bottom character parts are associated with keys generally located in physically similarly related positions on the left, right, top and bottom, respectively, of the keyboard.

24 Claims, 11 Drawing Sheets

MATRIX DATABASE OF THE "TRADITIONAL" KEYBOARD 16
8
1
7
7
5
30
0
14 33 69 69
14 35 69 69
14 36 69 69
14 43 69 69
14 52 69 69
14 51 69 69

MATRIX DATABASE OF THE "SIMPLIFIED" KEYBOARD

LIST OF SAMPLE ENTRIES OF THE GB CHARACTER INPUT DATABASE

| Char | Code | Keys | | | Char | Code | Keys | | |
|---|---|---|---|---|---|---|---|---|---|
| 落 | C2E4 | J00 | C20 | E30 M10 | 慢 | C2F8 | C33 | L40 | K30 F40 |
| 落 | C2E4 | J00 | C20 | E30 N10 | 慢 | C2F8 | C33 | L40 | L23 E80 |
| 落 | C2E4 | J00 | C20 | F30 J10 | 慢 | C2F8 | C33 | L40 | L23 F10 |
| 落 | C2E4 | J00 | C20 | M00 L20 | 慢 | C2F8 | C33 | L40 | L23 F40 |
| 洛 | C2E5 | C20 | E30 | M10 L20 | 慢 | C2F8 | C33 | L40 | M30 M10 |
| 洛 | C2E5 | C20 | E30 | N10 E30 | 慢 | C2F8 | C33 | L40 | M30 N10 |
| 洛 | C2E5 | C20 | F30 | J10 L20 | 慢 | C2F8 | C33 | L40 | M33 M10 |
| 洛 | C2E5 | C20 | M00 | L20 | 慢 | C2F8 | C33 | L40 | M33 N10 |
| 骆 | C2E6 | N53 | E30 | M10 L20 | 蛮 | C2F9 | E10 | H80 | J50 |
| 骆 | C2E6 | N53 | E30 | N10 E30 | 满 | C2FA | C20 | G50 | |
| 骆 | C2E6 | N53 | F30 | J10 L20 | 满 | C2FA | C20 | G50 | I10 |
| 骆 | C2E6 | N53 | M00 | L20 | 满 | C2FA | C20 | G50 | K30 I10 |
| 络 | C2E7 | C30 | E30 | M10 L20 | 满 | C2FA | C20 | G50 | K60 |
| 络 | C2E7 | C30 | E30 | N10 E30 | 满 | C2FA | C20 | J00 | E40 |
| 络 | C2E7 | C30 | F30 | J10 L20 | 满 | C2FA | C20 | J00 | E40 K30 |
| 络 | C2E7 | C30 | M00 | L20 | 蔓 | C2FB | J00 | L40 | K30 E80 |
| 妈 | C2E8 | C73 | N53 | | 蔓 | C2FB | J00 | L40 | K30 F10 |
| 麻 | C2E9 | F00 | I70 | I70 | 蔓 | C2FB | J00 | L40 | K30 F40 |
| 麻 | C2E9 | M60 | F00 | | 蔓 | C2FB | J00 | L40 | L23 E80 |
| 玛 | C2EA | G30 | N53 | | 蔓 | C2FB | J00 | L40 | L23 F10 |
| 码 | C2EB | F70 | L20 | N53 | 蔓 | C2FB | J00 | L40 | L23 F40 |
| 蚂 | C2EC | J50 | N53 | | 蔓 | C2FB | J00 | L40 | M30 M10 |
| 马 | C2ED | N53 | | | 蔓 | C2FB | J00 | L40 | M30 N10 |
| 骂 | C2EE | L23 | | | 蔓 | C2FB | J00 | L40 | M33 M10 |
| 嘛 | C2EF | L20 | F00 | | 蔓 | C2FB | J00 | L40 | M33 N10 |
| 嘛 | C2EF | L20 | F00 | I70 I70 | 曼 | C2FC | L40 | K30 | E80 E40 |
| 吗 | C2F0 | L20 | N53 | | 曼 | C2FC | L40 | K30 | F10 E40 |
| 埋 | C2F1 | H40 | M50 | E40 | 曼 | C2FC | L40 | K30 | F40 E40 |
| 埋 | C2F1 | H40 | M50 | F40 | 曼 | C2FC | L40 | K33 | E80 M10 |
| 买 | C2F2 | N10 | F10 | I20 | 曼 | C2FC | L40 | L23 | E80 M10 |
| 买 | C2F2 | N10 | I20 | F10 | 曼 | C2FC | L40 | L23 | E80 N10 |
| 麦 | C2F3 | H30 | E30 | M10 | 曼 | C2FC | L40 | L23 | F10 M10 |
| 麦 | C2F3 | H30 | F30 | J10 | 曼 | C2FC | L40 | L23 | F10 N10 |
| 麦 | C2F3 | H30 | M00 | | 曼 | C2FC | L40 | L23 | F40 M10 |
| 麦 | C2F3 | H33 | M10 | | 曼 | C2FC | L40 | L23 | F40 N10 |
| 麦 | C2F3 | H33 | N10 | E30 | 曼 | C2FC | L40 | M30 | M10 |
| 卖 | C2F4 | F60 | F10 | I20 | 曼 | C2FC | L40 | M30 | N10 E30 |
| 卖 | C2F4 | F60 | I20 | F10 | 曼 | C2FC | L40 | M33 | M10 |
| 卖 | C2F4 | F60 | N10 | F10 I20 | 曼 | C2FC | L40 | M33 | N10 E30 |
| 卖 | C2F4 | F60 | N10 | I20 F10 | 慢 | C2FD | C13 | L40 | K30 E80 |
| 迈 | C2F5 | E40 | K00 | N40 | 慢 | C2FD | C13 | L40 | K30 F10 |
| 迈 | C2F5 | E40 | N00 | N40 | 慢 | C2FD | C13 | L40 | K30 F40 |
| 脉 | C2F6 | K40 | E10 | E50 | 慢 | C2FD | C13 | L40 | L23 E80 |
| 瞒 | C2F7 | M40 | G50 | I10 | 慢 | C2FD | C13 | L40 | L23 F10 |
| 瞒 | C2F7 | M40 | G50 | K30 I10 | 慢 | C2FD | C13 | L40 | L23 F40 |
| 瞒 | C2F7 | M40 | G50 | K60 | 慢 | C2FD | C13 | L40 | M30 M10 |
| 瞒 | C2F7 | M40 | J00 | E40 K30 | 慢 | C2FD | C13 | L40 | M30 N10 |
| 瞒 | C2F7 | M40 | J00 | E40 K60 | 慢 | C2FD | C13 | L40 | M33 M10 |
| 慢 | C2F8 | C33 | L40 | K30 E80 | 慢 | C2FD | C13 | L40 | M33 N10 |
| 慢 | C2F8 | C33 | L40 | K30 F10 | 漫 | C2FE | C20 | L40 | K30 E80 |

FIGURE 10

LIST OF SAMPLE ENTRIES
OF THE BIG-5 CHARACTER SET INTERFACE DATABASE

| 字 | 碼 | 編碼 | | | | 字 | 碼 | 編碼 | | |
|---|---|---|---|---|---|---|---|---|---|---|
| 址 | A77D | H40 | F50 | E50 | E40 | 孚 | A7B7 | H00 | N40 | |
| 址 | A77D | H40 | F53 | | | 字 | A7B8 | F60 | A03 | N40 |
| 坍 | A77E | H40 | K30 | E10 | | 字 | A7B8 | F60 | L43 | N40 |
| 均 | A7A1 | H40 | N00 | F10 | | 字 | A7B8 | F60 | N40 | |
| 均 | A7A1 | H40 | N00 | F40 | | 孛 | A7B9 | A00 | F40 | E80 |
| 坎 | A7A2 | H40 | A03 | | | 完 | A7BA | A00 | I70 | |
| 坎 | A7A2 | H40 | A03 | I10 | | 宋 | A7BB | A00 | F60 | D40 |
| 坂 | A7A3 | H40 | N30 | I10 | | 宏 | A7BC | D83 | I10 | F40 |
| 坂 | A7A3 | H40 | N43 | E30 | | 宏 | A7BC | E80 | I10 | F40 |
| 坐 | A7A4 | I10 | H40 | | | 尬 | A7BD | D00 | N00 | L20 |
| 坐 | A7A4 | I10 | I10 | H40 | | 尬 | A7BD | M20 | E30 | N00 | L20 |
| 坏 | A7A5 | H40 | E40 | E30 | E50 | 局 | A7BE | D00 | D60 | D60 |
| 坏 | A7A5 | H40 | E40 | E30 | F50 | 局 | A7BE | M20 | E30 | D60 | D60 |
| 坏 | A7A5 | H40 | K70 | E10 | | 屁 | A7BF | D00 | E50 | |
| 坏 | A7A5 | H40 | N10 | E50 | E10 | 屁 | A7BF | M20 | E30 | E50 |
| 坏 | A7A5 | H40 | N10 | F50 | | 尿 | A7C0 | D00 | G63 | |
| 坏 | A7A5 | H40 | N10 | F50 | E40 | 尿 | A7C0 | M20 | E30 | G63 |
| 圻 | A7A6 | H40 | E00 | | | 尾 | A7C1 | L30 | F60 | E30 |
| 圻 | A7A6 | H40 | E00 | F70 | | 尾 | A7C1 | L30 | F60 | M10 |
| 壯 | A7A7 | C70 | E50 | | | 岐 | A7C2 | L30 | N10 | |
| 夾 | A7A8 | I20 | I10 | | | 岑 | A7C3 | F10 | K00 | L30 |
| 夾 | A7A8 | I20 | I10 | I10 | | 岌 | A7C4 | L30 | N30 | I10 |
| 妝 | A7A9 | C70 | E30 | | | 岌 | A7C4 | L30 | N43 | E30 |
| 妒 | A7AA | C73 | D03 | | | 巫 | A7C5 | I63 | I10 | |
| 妒 | A7AA | C73 | E00 | M20 | | 巫 | A7C5 | I63 | I10 | I10 |
| 妒 | A7AA | C73 | E10 | D00 | | 希 | A7C6 | J10 | F60 | K30 |
| 妒 | A7AA | C73 | E10 | M20 | E30 | 序 | A7C7 | E10 | E30 | N60 |
| 妒 | A7AA | C73 | E30 | D00 | | 序 | A7C7 | F00 | N60 | |
| 妒 | A7AA | C73 | E30 | M20 | E30 | 庇 | A7C8 | E10 | E30 | D60 | D60 |
| 妨 | A7AB | C73 | E10 | | | 庇 | A7C8 | F00 | D60 | D60 |
| 妞 | A7AC | C73 | K00 | E10 | E40 | 床 | A7C9 | E10 | E30 | I70 |
| 妞 | A7AC | C73 | K00 | E40 | | 床 | A7C9 | F00 | I70 | |
| 妞 | A7AC | C73 | K00 | F40 | | 廷 | A7CA | E30 | H40 | N40 |
| 妞 | A7AC | C73 | N10 | H40 | | 廷 | A7CA | G33 | N40 | |
| 妣 | A7AD | C73 | D60 | D60 | | 弄 | A7CB | G30 | J00 | |
| 妙 | A7AE | C73 | F20 | E30 | | 弟 | A7CC | F10 | N23 | |
| 妖 | A7AF | C73 | E30 | I20 | | 彤 | A7CD | K30 | E10 | C80 |
| 妖 | A7AF | C73 | J20 | | | 彤 | A7CD | K30 | E10 | E30 | E30 |
| 妍 | A7B0 | C73 | F10 | G53 | | 形 | A7CE | G50 | E30 | E30 |
| 妤 | A7B1 | C73 | N60 | | | 形 | A7CE | G53 | E30 | E30 | E30 |
| 妓 | A7B2 | C73 | F60 | E30 | | 彷 | A7CF | C03 | E10 | |
| 妓 | A7B2 | C73 | F60 | N10 | E30 | 役 | A7D0 | C03 | F80 | M10 |
| 妊 | A7B3 | C73 | E30 | H40 | | 役 | A7D0 | C03 | F80 | N10 | E30 |
| 妊 | A7B3 | C73 | E60 | E40 | | 役 | A7D0 | C03 | K83 | |
| 妊 | A7B3 | C73 | G33 | | | 忘 | A7D1 | E10 | D40 | F23 |
| 妥 | A7B4 | H00 | C73 | | | 忘 | A7D1 | E10 | K20 | F23 |
| 孝 | A7B5 | F60 | F60 | N40 | | 忘 | A7D1 | I53 | F23 | |
| 孜 | A7B6 | N40 | E30 | M10 | | 忌 | A7D2 | D53 | F23 | |
| 孜 | A7B6 | N40 | E30 | N10 | E30 | 志 | A7D3 | H40 | F23 | |
| 孜 | A7B6 | N40 | F30 | J10 | | 忍 | A7D4 | K00 | E10 | F23 |
| 孜 | A7B6 | N40 | M00 | | | | | | | |

KEYBOARD INPUT DEVICES, METHODS AND SYSTEMS

FIELD OF THE INVENTION

This invention relates to keyboard input devices and particularly those for the Chinese language although it is to be understood that the principles of the invention may well be applied to other languages which use hieroglyphic or other symbols or characters rather than alphabet oriented characters.

Chinese characters are generally made up of strokes and radicals. Strokes are essentially single components whereas radicals are effectively subentities or characters. The latter embody specific meaning and are primarily used for dictionary search, because Chinese characters are classified according to their dominant radicals and their number of strokes.

Of course, a simple character may just have one or more simple strokes and more complex characters can be a single radical, or they could be a combination of radicals and strokes.

BACKGROUND of the INVENTION

The conventional Chinese manual typewriter has a bank of character dice. It is a bulky and heavy device and therefore not readily portable. When a particular character is selected, the character die is removed from the bank, and struck onto the paper and then returned to the bank.

This is an extremely complex and difficult operation requiring a high level and range of mental and physical skills. Many thousands of character dice need to be stored in the bank if a modest and satisfactory vocabulary were to be incorporated. The operator of such a typewriter has to be extremely skilled to search and locate, and then manipulate the device to achieve a result within a meaningful time frame. The utilisation of such a manual typewriter is by and large restrictive and useful only for commercial and publishing enterprises.

Since computerisation, many forms of Chinese language computer related typing or input devices, methods or systems have been proposed or come into existence. Such devices, methods or systems are fundamentally based on the standard electronic "alphanumeric keyboard" (Qwerty keyboard) and, in one form, use a combination of keys to activate an electronic search. Such a search may normally bring up a number of possible characters with similar homophonic or graphic properties, and from which the operator may select the one required.

Electronically, Chinese characters are fundamentally linked to two particular "Character Sets" or "Character Codes" respectively. These sets or codes are often referred to as "Internal Codes" (內碼) "Traditional" (繁體) characters are linked to the Big-5 (大五號) Set. Whereas "Simplified" (簡體) characters are linked to the GuoBiao (國標) commonly referred to as the GB.

The Big-5 (大五號) character set originated in Taiwan and is made up of 13,050 "Traditional" characters. The characters are arranged traditionally, that is, according to the order of strokes and radicals. Each character is given a four letter-numeral reference in descending order. These references are often referred to as the Internal Codes (內碼) of the "Character Set".

On the other hand, the GB (國標) character set came from the People's Republic of China and has about 7,000 "Simplified" characters, where common words are arranged in a phonetic order, and rare words are arranged according to radical groups. It has a similar four letter-numeral internal code. While important for technical and programming applications, these codes are seldom, if ever, seriously considered as a practical basis for user input methods.

Based on similar schematic structures, the "Traditional" Big-5 (大五號) and the "Simplified" GB (國標) share many common schematic properties. But unfortunately, these common properties refer to very different objects, thus making it logically impossible for the two "Character Sets" to actively share the same environment at any given time. In other words, access to the two sets at any given time is denied. They are logically incompatible.

Moreover, in the process of character simplification and vocabulary reduction, many "Traditional" characters were retained. In the interest of reduction in the size of the vocabulary and the simplification of form and structure, many simplified characters were contrived to individually replace two or more different "Traditional" characters. For conversion purposes, this has resulted in the inherent difficulties of matching one "Character Set" with the other. Thus while it is possible to convert from "Traditional" to "Simplified" on a many-to-one basis, it is logically impossible to do so, without human intervention, from "Simplified" to "Traditional". To put this in another way and where the two "Character Sets" are involved, it may be possible to contrive a means by which "Traditional" texts can be automatically converted into "Simplified" forms. But when it comes to reversing the process, human intervention is necessary.

As stated, the two "Character Sets" are mutually incompatible. Popular opinion is that a better, more inclusive and very different coding system is needed. One such code known as Unicode has been created. Its inclusiveness extends across languages including English, Chinese, Japanese and Korean. Although its current version has problems and lacks widespread acceptance, it is nevertheless a very promising development.

The present invention has been developed in part in an endeavour to adapt a keyboard input device to any existing Internal Code, including Unicode or its successors, as well as any graphic based language.

The "Traditional"(繁體) characters have been used universally until the emergence of the People's Republic of China (PRC). Since then they remain as the standard outside the PRC. As for the PRC, the "Simplified" (簡體) characters, developed concurrently with her Pinyin (拼音) spelling method, become the norm for Mainland China. As a whole, the two are significantly different from one another. Users of the two forms have much difficulty in understanding and writing each other's version. Furthermore, as romanisation of Chinese gained popularity over the Mandarin Phonetic symbols (注音符號), spelling systems developed along separate lines, in and outside Chinese circles, leaving behind the current legacy of diversity. For "Traditional" characters, most popular dictionaries tend to follow the Thomas Wade and the Guoyeu Romatzyh (國語羅馬化) spelling systems. For "Simplified" characters, the PRC has her Pinyin ( ) instead.

DESCRIPTION OF THE PRIOR ART

Previously proposed devices and systems fall into two broad input categories, namely the "construction" and the "spelling" categories.

The input process of the "construction" approach involves construction graphic characters from building components of strokes and radicals, the latter being more than 220 in number. Systems have been developed to reduce the multitude of components that make up Chinese characters to manageable number so that the essential number may be represented by the keys of the Qwerty keyboard. The alphanumeric keys that identify the various proposed building components of characters, and the precise sequence that these keys. must follow in the input process is commonly referred to as the External Code (外碼) of the characters in question. It will now be clear to the reader that the External Code (外碼) is inseparably linked to the Internal Code (內碼) of the "Character Set" (Big-5 or GB).

All "construction" input methods develop their own unique External Code (外碼). Naturally, they differ from one another in their choice and number of building components, the alphanumeric representations (羅馬字數) thereof, and the strict order by which the building components are to be strung together.

The key arrangement and keyboard operation vary from one device, method or system to another. In the simplest form, each stroke, or stroke-form is essentially given a number or a letter of the alphabet, and depending upon the form of device, method or system, these could be from four to six different numbers or alphabets. These numbers or alphabets, or the combination of the two are then keyed in sequentially. Normally they are based on the order in which a particular character would be written, until the keystrokes are completed or would lead to what is seen as an unambiguous character, or characters showing some dominant common features.

These forms of operation need a highly skilled operator with the following basic requirements:

(a) knowledge and efficiency in the use of the "alphanumeric keyboard";

(b) a good knowledge and ability to use a given code;

(c) familiarity with a set of given rules which are often complex, rigid and inconsistent.

In the final stage of the process the operator often needs to make a selection of the particular character in mind from a number of presented characters.

"Construction" systems and devices enjoy limited currency, success or lasting appeal. As noted above, the reasons for their short shelf life and poor appeal are obvious. With few exceptions, they require a fairly high level of Chinese literacy to carry out word analysis. They also require knowledge and skills to follow a rigid order of correct keystrokes. The user is faced with a complex, rigid and daunting barrage of rules and definitions. More often than not, to achieve a desired level, of typing speed, special External Codes need to be committed to memory. Distinctions may need to be made regarding "common" and "rare" words so that they may be treated differently. With few exceptions, if any, there is absolutely only one way to construct any particular character. They fail to provide for marginal errors, users' lack of familiarity with the many and different forms of variant words (current, archaic, corrupted, popular, in-use, out-of-use, printed, or hand-written forms). And for input purposes, they do not accept such variants. When typing mixed Chinese and English texts, users are required to manually and repeatedly switch between the two (Chinese and English) input methods. Often when users reach an input impasse, they have no other choice but to switch over to other input methods in order to carry on, if at all possible. Finally, having done some or all of the above, the users must look for and select the targeted word from word lists presented on the screen.

In brief, current "construction" devices, methods and systems based on the Qwerty keyboard are rigid and user-unfriendly. Prospective users are dissuaded from using them because of the skills and levels of commitment required of them.

Most marketed products are based on the "Spelling" approach. While it is recognised that the Pinyin (拼音) romanisation has gained ascendancy in this field, it must be borne in mind that there is no universally recognised standard of romanisation. Nor is there likely to be one in the foreseeable future.

Like its western counter-parts, romanised words can be arranged alphabetically and phonetically in descending order. Relatively, they are simple to classify, encode and manipulate. However, unlike Latin based languages Mandarin Chinese (Putonghua 普通話) in particular is a homophonic language with four specific levels of tonal values. Though completely different in their meaning, usage or form, many Chinese words share common phonetic and tonal values.

Furthermore, the same words may change their context-specific meanings, often resulting in changes of phonetic and tonal values. On the other hand different words may have the same phonetic and tonal values whether they have the same meaning or not. Therefore one may list words which share certain common sequential letters of the alphabet, or all the letters of words. But owning to the commonly shared homophonic and tonal values, it is logically impossible to eliminate the process of selection. The process of indexing may reduce substantial difficulties. For example, it may help narrow word lists, or reduce the tasks of typing out the full words. But whatever their improved capabilities may be, by themselves or in concert, they cannot provide any absolute solution.

Various methods of indexing have given rise to various "intelligent systems" or intelligent features. Indexes are established for frequently used words, used in association with one another, words used in association with terms or phrases, and words used in context with immediately preceding words, and so on. These "intelligent" features are incorporated into many systems or are offered as options to be turned on and off. At their best, these are helpful features only for some of the time. At their worst, they may become woeful distractions, liabilities, or down right nuisance. The truth is no "intelligent" systems or indexing can possibly anticipate absolutely what the user has in mind.

Speakers of Chinese as a second language have found it necessary to use something like Pinyin (拼音) to get them started. But even at a very early stage, they need to make a quick transition from the romanised to the graphic forms if they are to make any progress at all. Once the transition is made, learning takes place in the traditionally Chinese fashion—constant practice, hand writing exercises and word drills. Once the transition happens, confidence and competency in romanisation is often diminished through disuse and lack of practice.

For native speakers, language acquisitions begin at an early age. Though one may possibly be introduced to romanisation at a later stage of the learning process, it would hardly ever be necessary to think or operate in a romanisation environment, except for computer operations. As in the case of speakers of Chinese as a second language, romanisation inevitably suffer the same fate. Thus it is not surprising that most Chinese speakers do not know or have the confidence and competence in romanisation to be enthusiastically interested in using "spelling" products.

One of the serious difficulties with all the existing "spelling" devices, methods or systems is that it is an imported "foreign" phonetic system. There is no universally accepted standard of spelling and it is unlikely that such a standard will be adopted in the foreseeable future.

Another difficulty relates to the complexity of the Chinese language. It is common that users who possess a high level of Chinese literacy may not know the pronunciation, much less the correct pronunciation of a great many words, even though they may know their meaning and use absolutely. There are also many instances when they may not know the numerous variant forms of the same words. As we have noted earlier, such variant forms extend over a range of current, archaic, corrupted, popular, in-use, out-of-use, printed and handwritten forms. A search of the dictionary may not necessarily resolve the difficulty because of the differing spelling systems and such systems are based either on a foreign language alphabet (English) or the Mandarin Phonetic alphabet (華語注音符號). With reference to the latter, comparatively few are familiar with it.

The fundamental difficulty with the "spelling" system is that when the user is not able to spell a given word, or spell it correctly according to the spelling system in use, he would find it difficult to proceed. To spell properly, the user needs to know the correct and standard pronunciation or words, distinguish subtle differences in phonetic and accent, deliberate on linguistic, geographical and subjective cultural differences, consult different spelling systems and dictionaries, and so on. Thus, ultimately, if it is not possible to pronounce a word perfectly and correctly, an impasse is reached.

The present invention attempts to address at least some of the fundamental problems mentioned above. The outcome lies not in the incorporation of foreign elements into the system or the acceptance of the Qwerty keyboard as the ultimate tool. Its approach is based on the nature of the Chinese character itself, and, in particular forms, the invention makes the prior art, alphabet-oriented spelling approach redundant.

Speech Recognition and Writing Pad

Great advances are being made in the area of speech recognition and electronic writing pads. However, as practical and efficient input methods, they are still a very long way away from displacing, if ever, the generic need for a keyboard. However, they do have practical and useful applications. Furthermore, almost all the above mentioned problems faced by "spelling systems" apply equally, if not more, to speech recognition.

As discussed herein, it can be seen that proposals hitherto are targeted at specific minority groups. Proposals utilising the "construction" and "spelling" methods have serious limitations and are not easy to use. Without exception, they are totally reliant on the Qwerty keyboard. It is considered that such restrictive dependence is their common, most serious and fundamental shortcoming. The Qwerty keyboard evolved from the specific nature of the English language that is fundamentally and generically different from and far less complex than Chinese. Thus, attempting to fit Chinese into an English model must lead to difficulties.

The mass market would not be better served by a proliferation of more of the same kind, or improved versions of what are already in the market. A solution lies in decisively moving away from a slavish dependence on the Qwerty keyboard.

Accordingly, it is desirable to provide a keyboard, and in one particular embodiment, a keyboard for use with the Chinese language, that substantially overcomes the restrictions and difficulties of existent input devices, methods or systems set out hereinbefore.

It is also desirable to provide a keyboard that can be readily and flexibly operated by an operator without the necessary prerequisites of high degrees of skill and knowledge of the system and respective languages as is required by other input devices.

It is also desirable to provide a keyboard input which is able to be used in a method of identifying characters.

SUMMARY OF THE INVENTION

According to one aspect of the invention there is provided a keyboard for inputting graphical indicium representations of language characters formed from one or a combination of character units, the keyboard having a plurality of keys, each key having at least one unit associated therewith, the units all being different and each forming at least a part of a character, the keys being so arranged on the keyboard that visually similar units are associated with the same or adjacent keys, a key mapping for each key whereby selection of a key generates a mapped value of the unit associated with the selected key, the mapped value having a relational correlation with one or more relevant characters, and selection of one or more further keys which are associated with the same or other units provide further mapped values consistent with at least one of the relevant characters such that a character that is unique to the selected key or combination of keys is determined.

According to another aspect of the invention there is provided a method of constructing graphical indicium representations of language characters formed from one or a combination of character units including the steps of:

providing a keyboard having a plurality of keys each having at least one unit associated therewith, each unit being different from each other unit, and each forming at least a part of a character, arranging the keys so that visually similar units are on the same or adjacent keys, mapping each key to a mapped value which is a relational correlation with one or more relevant characters, generating one or more characters in response to a first or subsequent key actuation and constructing a character in accordance with the key actuations or the sequence of key actuations.

DESCRIPTION OF THE DRAWINGS

In order that the invention may be more readily understood, embodiments thereof will now be described with reference to the accompanying documents and drawings in which:

FIG. 6 is a list of the key value matrix for the "Traditional" keyboard, FIG. 7 is a list of the key value matrix for the "Simplified" keyboard, FIG. 9 is a list of sample entries for a GB character input database;

FIG. 10 is a list of sample entries of a Big-5 character input database.

DESCRIPTION OF THE PREFERRED EMBODIMENTS

In the following description of the embodiments of the present invention, and in the claims, the following terms are used which are intended to have the following meanings:

A "non-radical composite block" is a component of a character that is a combination of strokes and can appear in a number of different radicals or characters, but which has no meaning of itself. Such non-radical composite blocks provide a unique aspect of the invention. They are not found in the radical index of a dictionary or independently anywhere in a Chinese dictionary. By providing these unique composite blocks, it is possible to limit, to a very substantial degree, the number of different building units or components necessary to clearly define and construct a desired character.

A "unit" is a graphic indicium representation of any character, stroke, radical or non-radical composite block. Each key of the keyboard of the invention has at least one unit generated by actuation of the key.

Figure 1:
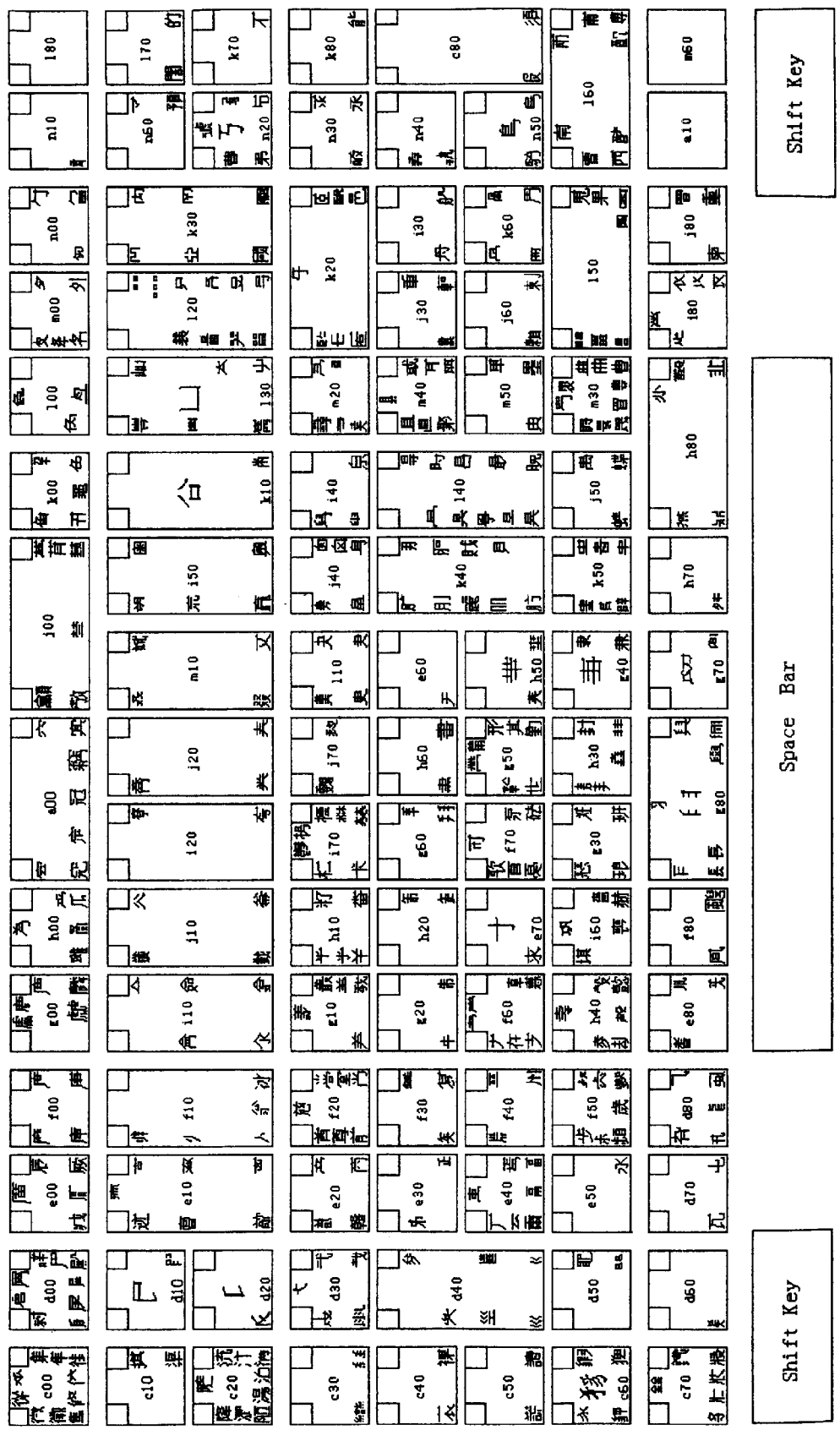
FIG. 1 is a schematic, top view of a keyboard in accordance with one embodiment of the invention showing some of the non-radical blocks which may be used to construct a character of a "Traditional" set.
Figure 2:
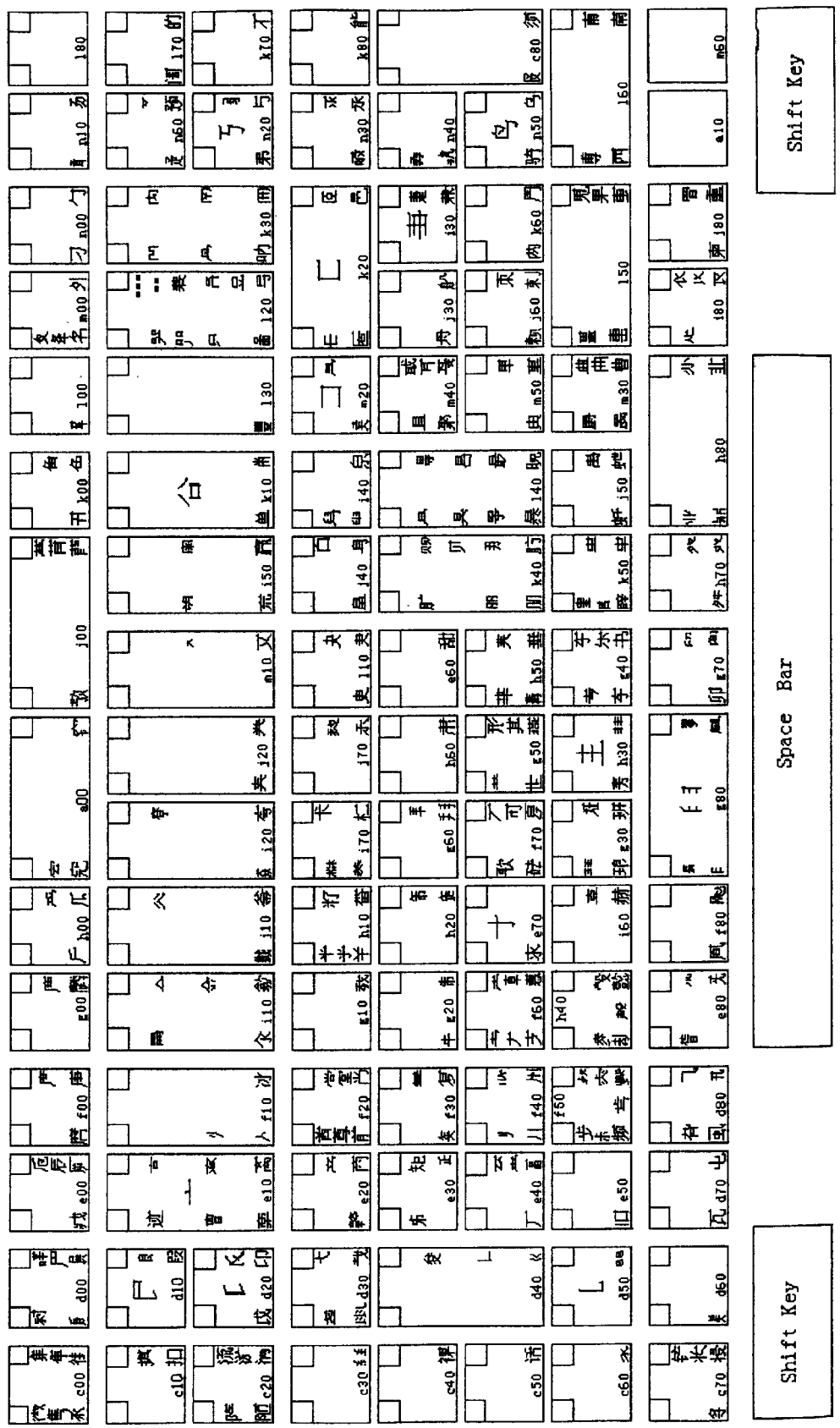
FIG. 2 is a schematic, top view of a keyboard similar to that shown in FIG. 1 but for use with a different ("Simplified") character set.
Figure 3:
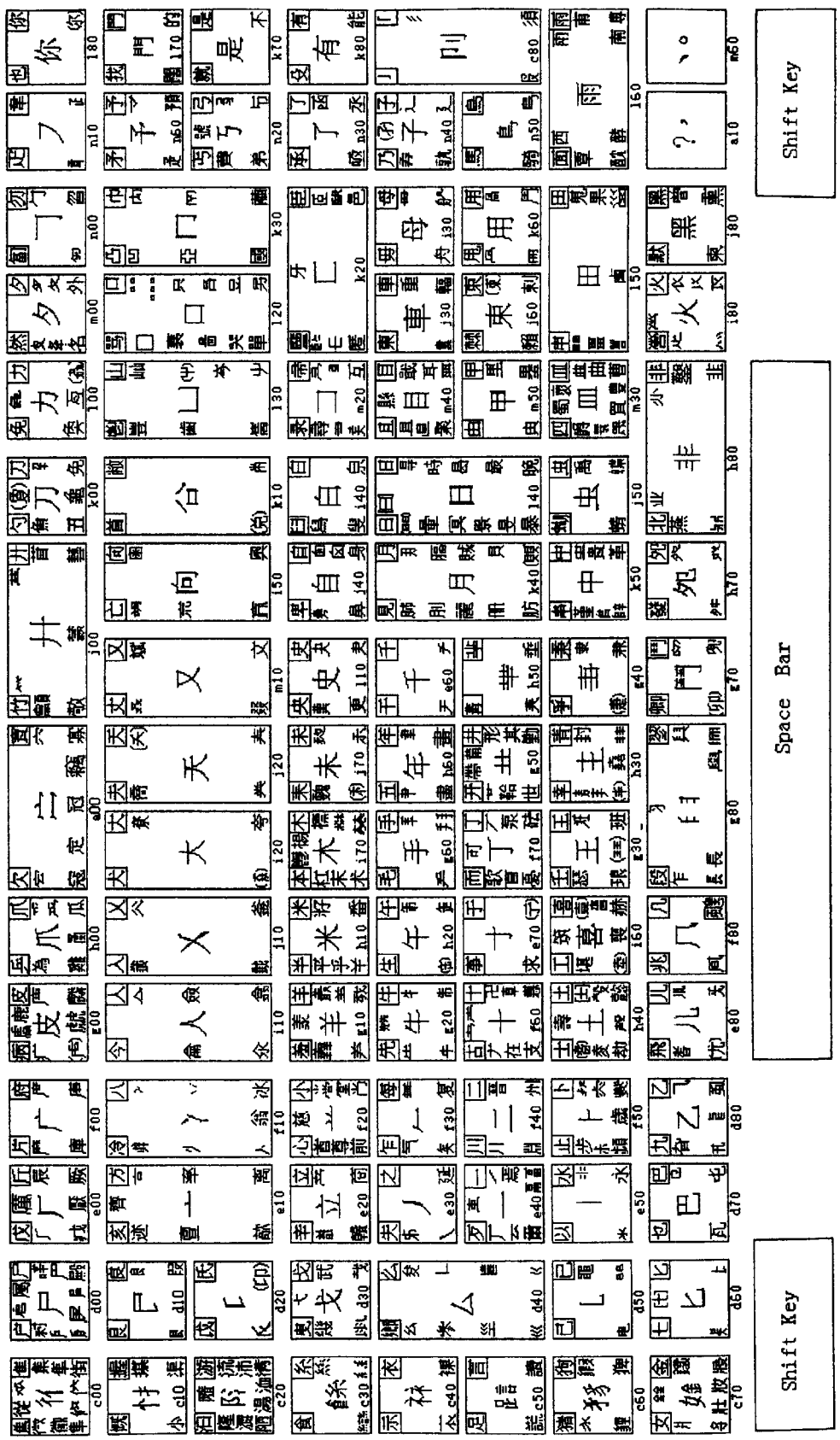
FIG. 3 is a schematic view of the keyboard of FIG. 1 showing the full layout of the characters and non-radical composite blocks for producing the traditional character set.
Figure 4:
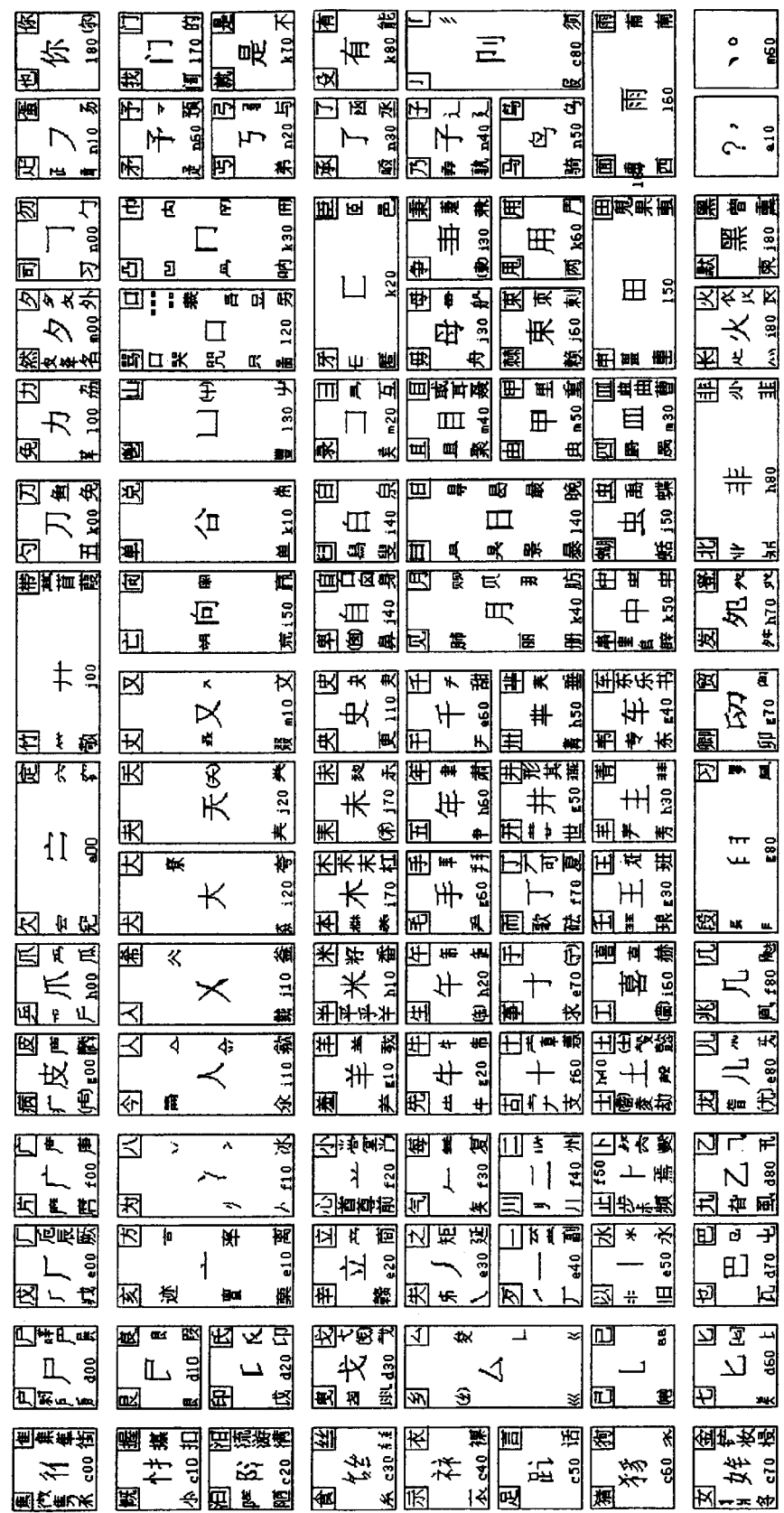
FIG. 4 is a view similar to that of FIG. 3 but for use is producing the "Simplified" character set.

Referring to the drawings, FIG. 1 illustrates in schematic form a keyboard showing some of the non-radical composite blocks and units associated with the various keys and which are used to construct a character of the "Traditional" character set. FIG. 2 illustrates a similar layout for the "Simplified" character set. FIGS. 3 and 4 illustrate the respective keyboards showing the full layout of characters, strokes, radicals and non-radical composite blocks for constructing the "Traditional" and "Simplified" character sets. On each key is a number of what looks like uncompleted parts or units of a character. Some of these have dots, a line or strokes missing. Other units are simple forms of characters (non-radical blocks) that can be combined with other units to form words. There are two fully formed words embedded in each key. A careful look at the units on each key will reveal all the units on each key share a common basic form. This common basic form, often a word in its own right, appears in a larger print, and placed at the centre of the key. These arrangements are part of the design to help an operator quickly to identify the individual units and keys that are needed for the construction of words.

Each key shows the units associated therewith as well as the relevant common feature of the units, and different characters, radicals, strokes and/or non-radical composite blocks to which the unit gives rise when actuated. Thus, referring to the key having the key value j10 in FIG. 3, the common element of the associated units is shown on the centre of the key and two units are illustrated in the boxes at the top of the key. One unit is generated when the key is actuated normally and the other unit is generated when the key is actuated in conjunction with the "shift" key. As can be seen from FIG. 3 and FIG. 4, groups of keys are separated from other groups so that the keyboard can be conceived as a set of "mini-keyboards" (sub-keyboards), which can consist of a single key, or two keys, or up to 25 keys.

As has been pointed out, there are two fully formed words embedded in each key. When a particular key is actuated, the word embedded in that key may appear in a window on a display screen. In one form of the invention, if the space bar is actuated, the word will be transferred to a text area of the screen. If the key is actuated in its "shift" position, the keyboard and screen will respond by delivering the embedded word in the "shift" position. The operator, therefore, has an immediate vocabulary of more than 200 words.

In order to obtain an output from the keyboard, each key is mapped according to its position in columns and rows of the keyboard, and is assigned an alphabetical letter, followed by two digits, as shown in the drawings. This assignment is called the "key-value" or the "character-value". These two terms are used interchangeably. The letter represents the column position (A to N). The first digit represent the row position (zero to eight), and the second digit (either "zero" or "three") represents whether the key is in the "lower" case (digit "zero") or "upper" case (digit "three"). By "lower case" is meant a given key is activated independently of the "Shift Key", registering the value 'zero' (0). By "upper case" is meant a given key is activated in conjunction with the "Shift Key", registering the value 'three' (3).

Figure 5:
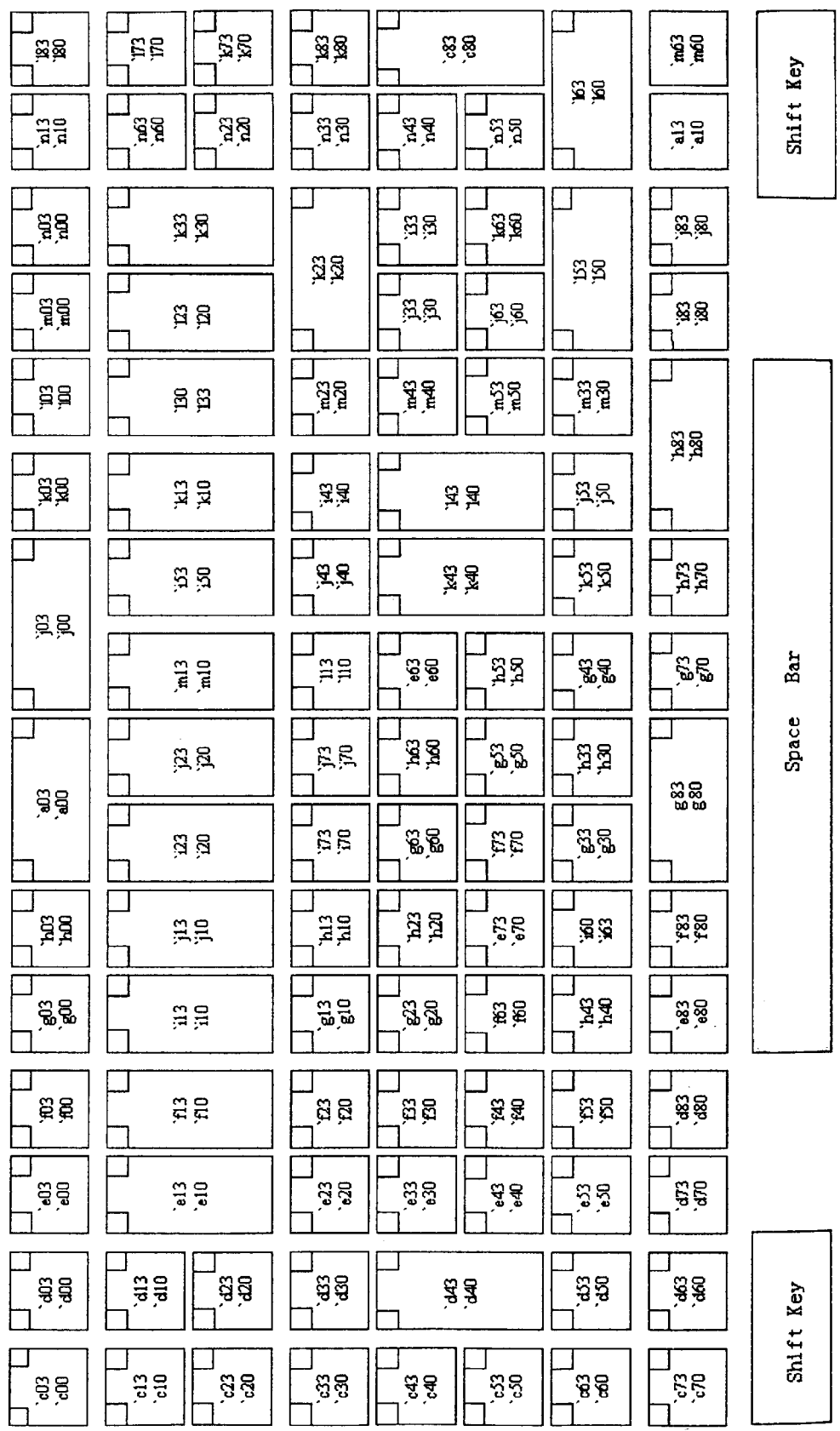
FIG. 5 is a schematic top view of a keyboard marked to illustrate the matrix of the "Traditional" and "Simplified" sets.
Figure 6:
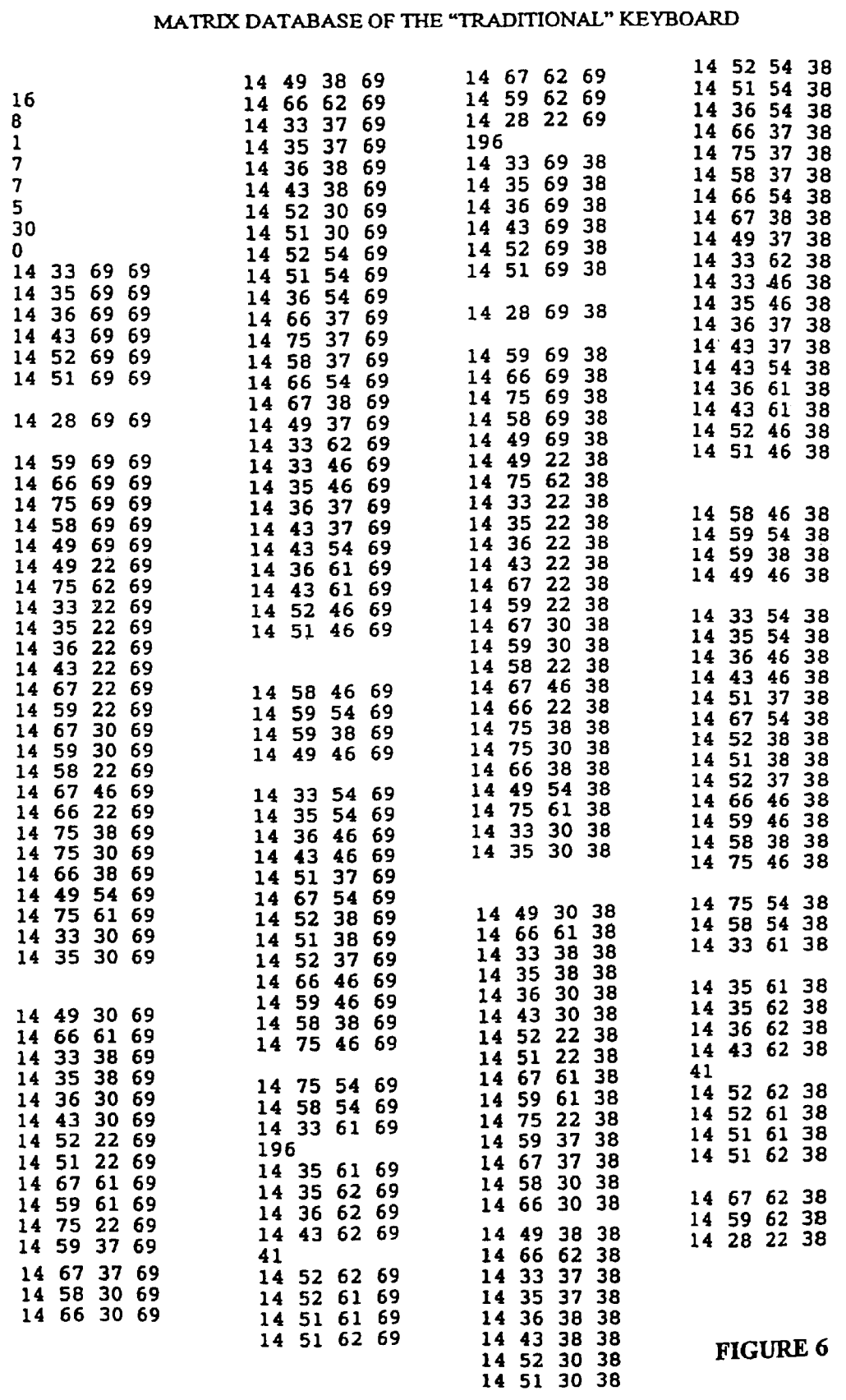
Figure 8:
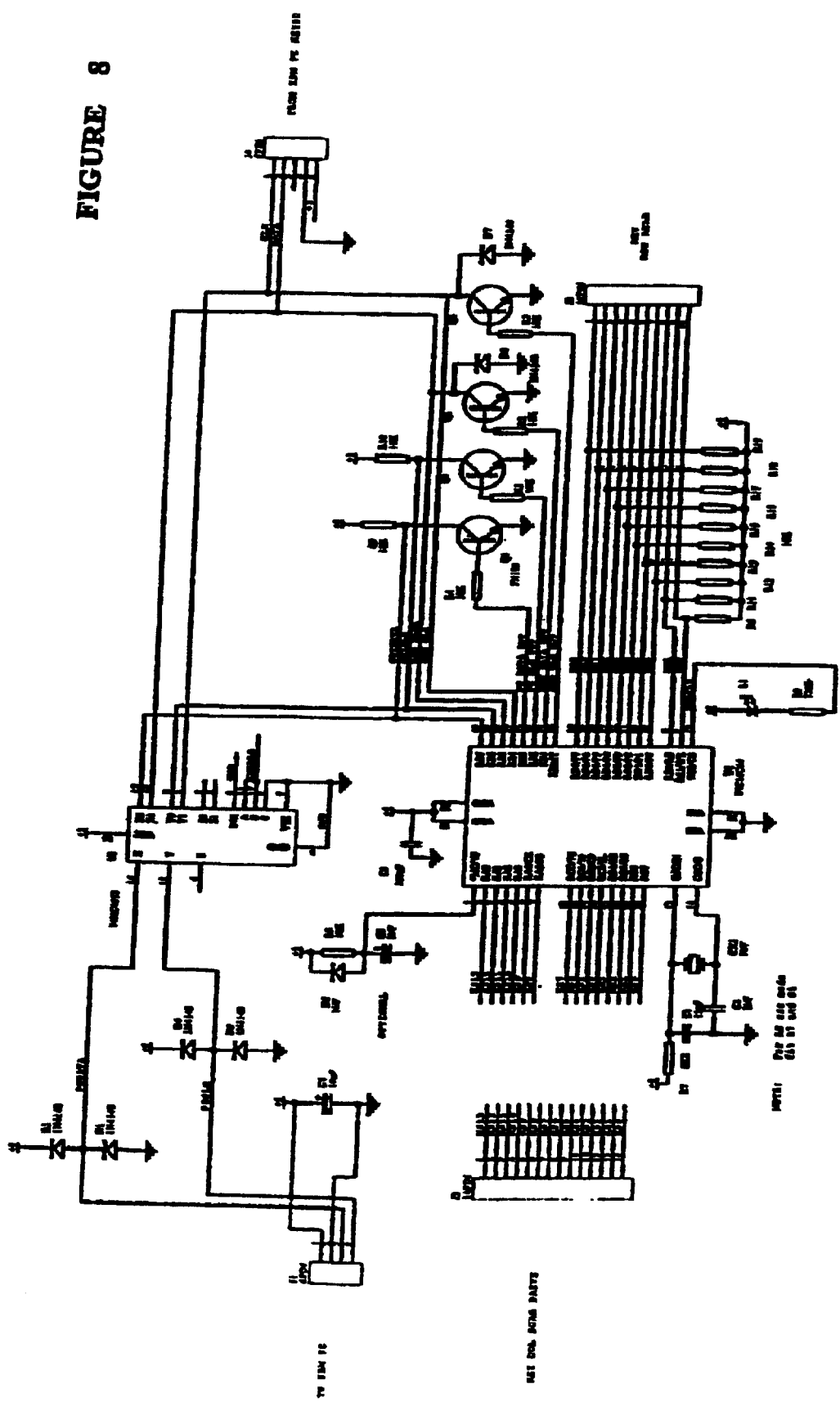
FIG. 8 is cancelled.

FIG. 5 shows the key values of a keyboard with the lower case and upper case key values for each key. These key values are stored in a table, and interact with the key value matrix, examples of which are shown in FIGS. 6 and 7. This table is a register of the physical location of the individual keys, and is preferably resident in the processor of the keyboard.

Figure 11:
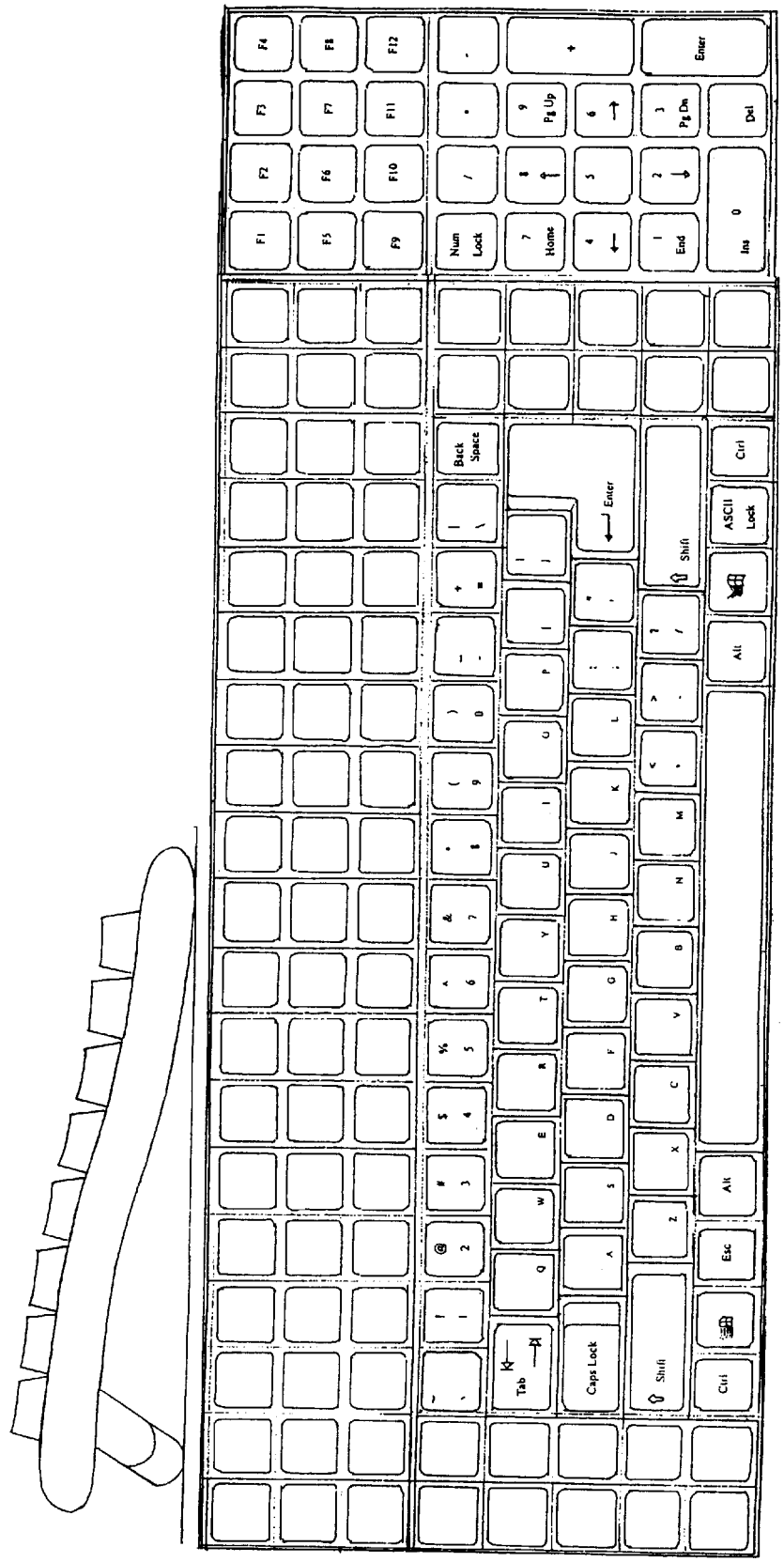
FIG. 11 illustrates a preliminary design of a two-in-one, stand-alone keyboard in accordance with another embodiment of the invention.

The keyboard can have any required number of keys, but it is preferred that it has 103 input keys, about the size of a conventional alphanumeric "Qwerty" keyboard. The commercially manufactured keyboard may incorporate a set of function and cursor keys that are not shown in FIGS. 1 to 4. It may also have a given set of alphanumeric keys embedded in some of the keys and activated by a toggle key or, alternatively it may have a virtual alphanumeric keyboard loaded into memory, which can be toggled on and off by a function key and activated by a pointing device like the mouse. This preferred option opens the way for the inclusion of keypads for mathematical, scientific symbols, and other languages. Provisions may be provided for the keyboard to piggyback on to an alphanumeric keyboard. But it is preferred that it is a stand-alone device, a look-alike of the Qwerty keyboard incorporating all the essential keys of the latter, such as is shown in FIG. 11.

The keyboards of the embodiments described are designed to be used in conjunction with a computer or other form of word processing system whereby appropriate software is able to respond to the actuation of the keyboard in the usual manner and produce an output on a screen, monitor or other output device that is representative of the key input.

As indicated, the units are basically arranged so that the units on a particular key have common features, and more often than not, the basis of this common feature is the unit shown on the centre of the key. The design is such that an operator looking for a particular visual unit can be led quickly to the key upon which it has been placed by looking for the basic common feature of this key.

An important feature of the embodiments described herein is the use of the "non-radical composite block" that assist in the application of the invention and forms an important feature of the systems illustrated. The layout of the keys is another important feature of the illustrated embodiments. The layout of the keyboard itself is so designed that the keys are placed in their most logical locations. For example, the units which usually form the top or bottom part of a character are preferably placed at the top or bottom of the keyboard, and those forming the right or left part of a character are placed at the right or left side of the keyboard respectively. Furthermore, those units which tend to be at the top left, top right or bottom left of a character are placed in those corresponding general areas of the keyboard.

In the different sub-keyboards previously referred to, sets of different units are incorporated. For example:

(a) A set of simple strokes which can generally be a single stroke or two strokes;

(b) The sets of crosses that can have a number of different forms but include at least two strokes crossing each other;

(c) The set of hooks which are those combinations of strokes where there are strokes in at least two different but not opposite directions and joined at one end;

(d) The set of squares which are those units which include at least three sides of a square; and (e) Sub-sets of the squares, being squares with strokes or crosses.

In the illustrated embodiments, the units on a key can either be strokes, radicals, non-radicals composite blocks, or character blocks. Having two units sharing the same key makes no difference as far as the construction process is concerned because the units on any given key are treated as mutually exclusive. When the same key is activated twice or more, or if a valid sequence of up to four keys is activated, only one valid result will occur. In use, the operator simply looks at the character to be entered and ascertains what particular patterns are required to define and construct the targeted character, and then seeks the keys that have the units. It will be recalled that the units are based, grouped and laid-out according to their respective common shapes and patterns.

In use of the keyboards illustrated, an operator should quickly commit certain groups of keys to memory. The first group of 4 keys is found on the top right-hand side of the keyboard, extending downward. These keys are related to frequently used personal pronouns, verbs and adjectives. Tagged on to this group is the key for the Chinese "inverted commas". The units "彡, 冂, 刂," on this key have to do with those parts of words that are found mostly on the right hand side of words. The other units 須, 艮 are derivatives of 彡 and 冂.

The second group of four keys is located horizontally at the bottom right hand side. Two of them are punctuation marks. The other two are unique keys. One has to do with units that form the bottom part of words. The other has to do with units that resemble the form of a "pair of spectacles". The third group of four keys is located next to the second group. The keys of this group share the common feature of symmetrical shapes. It takes a little bit of an effort for an operator to remember where these are located, and the details of the individual keys, but after a few hours of frequent use, they will be recalled spontaneously and effortlessly.

It will also be noted that the group of keys running from top to bottom on the left hand side of the keyboard has to do with radicals which are found on the left hand side of words. Similarly, at the top of the keyboard, the group of keys extending in a horizontal line towards the centre has to do with units that form the top part of words. The three groups of keys with their units shaped like "厂", "L" and "丁" contain those units usually located at the top-left, bottom-left and top-right corners of a character. In like fashion, the groups of keys on the main body of the keyboard possess units oriented to various common shapes. Such groups are rudimental strokes (dots, horizontal strokes, vertical stokes), X shapes, and variation of crosses, squares, rectangles and hooks. The largest group of 25 is located at the centre. Within each group, the individual keys are arranged in a logical order. For example, from one dot to two dots or from one line to two lines, and so on.

If the individual keys as shown in FIGS. 3 and 4 are compared, it will be noticed that a few of the units do not necessarily share the common forms of their hosts. They are strategically located there because these units can only form meaningful or valid combination with another unit, usually the centre unit on the same key. For example, "栽" is placed on the "羊" key because it can only combine with the latter to form "羲" or its derivatives. On the other hand, some units on the same key are not only placed there by virtue of common forms, but also by "association of ideas" with their host keys, or the keys next to the key in question. For example, the words "小心" (careful). "小" appears on the same key with "心". Or the words, "先生" (mister or teacher) are separately placed on adjacent keys.

As mentioned above, if there is a particular pattern at the top of the character, the search would normally be at the top of the keyboard. Also as already mentioned, each key tends to have a somewhat definitive unit so that the operator can readily ascertain the required key.

When discussing it in this manner, one is assuming that the operator has little knowledge of the keyboard. It will be appreciated that on frequent use, the location of a given area and possibly of specific keys by the operator will become completely intuitive. Touch-typing becomes a distinct possibility.

After the required key is struck, the operator then looks for another identifying component of the required character, finds the key and strikes it. This continues until the desired character has been constructed. Experience has shown that no more than four keystrokes are required to construct any given character, even if the construction process of the desired character is not completed. It is anticipated that every character of a particular "Character Set" will be able to be constructed or developed without failure within four key strokes.

The system of these embodiments of the invention is fully compatible with all Chinese language character sets. The number of characters incorporated in the system depends on the requirements of that system and its choice of "Character Set". For example, the "Simplified Character Set" (GB Popular Edition) used as the national standard in the People's Republic of China has about 7,000 characters, whereas a "traditional character" set such as the "Taiwan Industrial Computer Code" (Big-5), has over 13,000 characters. All these are able to be constructed with the respective embodiments of the invention.

Rules for Using the Keyboard

The keyboards of the embodiments illustrated follow the general rules of writing Chinese characters. In other words, the entry of keystrokes will correspond to the sequence of writing the same by hand. However, provisions are made for occasional departures from these. For instance, when two units are to be merged, the unit incorporating the first stroke of the union is to be keyed in first in full. By contrast, if the same two units are to be written by hand, it often happens that the writer would write part of the first unit, then the second or third unit, and come back to complete the first unit. The operator should observe this fundamental rule. However, an occasional departure from this rule should relate only to radicals and "composite blocks". As a concrete example, the conventional way of writing a "box" character is to write the open box, then fill in details inside the box according to the stroke order before closing the box. The departure from the rule when dealing with "composite blocks" is that the "box radical" should be keyed in first and then its contents. By contrast, in writing the "box" manually, the writer writes the bottom horizontal stroke last to close the "box". Nevertheless, the characteristic flexibility of the keyboard of the invention allows the operator in most instances to input the "box" in the hand-written way as well.

Where a character has the desired two units on the same key, or where the same unit on the same key is needed more than once, then this key is struck the number of times required. If the combination is a valid one, the desired result will ensue.

In the embodiments illustrated in the drawings, there are up to 24 ways the operator can construct the same character. More ways may be incorporated if desired. The operator can use different combinations of different keys, and of different numbers of keys, to construct the same character. These combinations take into consideration unintended input and perception errors. In this fashion maximum input flexibility is achieved. To operate the keyboard effectively, whilst skill is desirable, the skill required of the operator is chiefly related to the identification of visual blocks and striking the keys associated with them.

As a general rule, when words are constructed with the keyboard of the embodiments illustrated, no matter how complicated a word is, it should be visualised in no more than four separate but natural parts or units. The operator must bear in mind that instead of constructing words a stroke at a time, it should be constructed by blocks. A vast majority of words will conform to this way of visualisation. The comparatively few words that go beyond four parts or units do not cause any difficulty. It is only necessary to simply key in the first four units. The processing system will supply the remaining parts automatically. When words are visualised in this way, it is found that an operator can locate the keys containing the required units very quickly and easily. In many instances the flexibility of the system allows for a breakdown of the units in a variety of ways.

Some examples of word construction are as follows: 經= 糸+一+巛+工 Or 糸+一+坙. 校=木+一+八+乂. 學=臼+子; Or 鬯+丁+糸. 個={+口+古; Or {+口+十+口. 邊=鼻+辶 Or 自+ 穴+方+辶. Or 自+一+八+方+( ). Or 一+自+一+八+( ). Or 一+ 目+穴+方+( ).

Parts in ( ) are automatically filled in after the 4th keystroke.

Description of the Process and Functions of the System

As referred to above, in order to obtain an output from the keyboard, each key is mapped according to its position in the columns and rows of the keyboard. The letter represents the column and the first digit the row, and the second digit represents whether the key in the "Base" or "Shift" mode.

Furthermore, the same keys on the keyboard of the present embodiments are used in exactly the same way, whether used for constructing "Traditional" or "Simplified" characters.

Thus, whenever a key is struck, the unit value of that key is stored in memory, and when a further key is struck, the unit value relating to that key is appended to the first in the stored memory, and so on. The design order of the unit values and joint values (string values) of valid combinations corresponds to a value stored in a key value matrix table and interfaces with a predetermined translation table for the character set, such as those shown in FIGS. 9 and 10, whereby the appropriate character is generated by the keystroke combination. It will be seen from these figures that the different keystroke combinations are mapped to the "Internal Codes" of the various Chinese characters whereby each character can be identified. The translation table for the character set is preferably loaded into the memory of the operating system.

In one embodiment, on the first key being struck, an effective and immediate search is made of the database for a valid character corresponding to the value of that key. If a particular character is found, it can be displayed in, for example, a window at a corner of a display screen. Upon the next key being struck, if the combination of the two keystrokes is a valid one, a similar search for a valid character corresponding to the value of these combined keys can be made. The result can be made to replace the earlier display. And so on with the third and fourth keystroke. At any of the stages of the construction process, when the desired character is displayed, the process can be made to terminate by a function key such as the space bar. When that happens, the desired character is transferred from the display area to the appropriate place in the body of the text area. In the illustrated embodiments, keystrokes after the fourth and before transfer of the displayed character to the text will be ignored. Alternatively, if the construction process reaches the fourth or final stage, the desired character can be made to appear momentary in the display area, and then be automatically transferred in to the text area. The visual display device may function as a user's aid and may be made to be turned on or off at will.

Thus, as a rule, it will only be necessary for the operator to enter the requisite and valid combination of keys to retrieve a particular character. As mentioned earlier, this would require a maximum of four keystrokes. At the fourth keystroke, even if the assembled form appears to be incomplete, the four keystrokes are sufficient in the construction process to fully identify and retrieve the desired character from the character set. If the combination of units keyed in is not a valid one, then a blank will be displayed and the operator may try again. It is anticipated that this situation would rarely, if ever, occur as it is anticipated that all combinations of up to four keystrokes will be pointed to at least one character.

Various databases may be created to interface with most of the existing and popular character sets. The preferred embodiments of this invention provide databases to interface with the GB (Popular Edition) and the Big-5 character sets. The GB set is the People's Republic of China national standard for Chinese character computer communications. The Big-5 set is the Taiwanese industrial computer character code. As mentioned earlier, they have more than 7,000 simplified and 13,000 traditional characters respectively. There is no reason why this can not be done for new versions of the existing character set codes or new codes when they come into being.

Hard copy (printed page) of texts on screen or on stored files may be printed in their default form. It could be possible to have the texts converted and printed in another form, for example, from "traditional characters" to "simplified characters" and vice visa. However when this is done vice versa, corrections of wrongly converted characters may be required. Of course the quality of the print and the type of fonts will depend upon the printers, their capabilities, software and accessories.

The technology of the system hereindescribed incorporates both hardware and software. As stated above, it encompasses the following:

An array of specially created "building blocks" of "non-radical composite blocks";

An array of strokes, radicals and characters;

A unique keyboard layout of the keys;

For the purpose of constructing characters, a defined order, flexible sequence and combination of key-strokes;

A database of the defined order, sequence and combination of key-strokes as well as references to code definitions of a particular Chinese Character Set (Big-5 or GB); and A translation table for the character set;

The interface program, the driver.

A key value matrix table, which corresponds to the design order of the key-values and string of key-values of input combinations, interfaces with the translation table of the character set shown in FIGS. 9 and 10 which, when in operation, is resident in, or has been loaded into the memory of the operating system. The particular character set referred to may be the GB, the Big-5 or any other far east character set.

When a search is activated, the key value provides the basis for a match with the translation table of the character set. The particular code of the character set that is resident in the memory of the operating system is the depository bank from which Chinese characters are retrieved. Thus a successful search and match downloads the Chinese character from the character set, displays it on the screen, and moves the screen cursor one position to the right. Otherwise, there is no change on the screen.

The system of the invention can be used for software applications other than word processing, such as database and spreadsheets. It can also be applied to a number of new applications.

For example, current dictionaries of Chinese characters are extraordinarily difficult to use. Generally, they are based on the number of strokes of the character, and the classification of radicals. The present application leads to a very straightforward dictionary. Thus, when the valid visual units of the character are entered, the character displayed could be displayed as has been described together with the dictionary definitions, synonyms, visual representations (graphics and video), audio representations (pronunciation and sound), and other texts. Furthermore, and in addition or on its own, the dictionary definitions could be in a language other than Chinese. The system also can be applied to reading texts that have been loaded into memory. This has exciting implications for the visually impaired.

This could be taken somewhat further. It could be particularly useful for students and others when there could be an audible expression of the character, as well as the dictionary definition. Of course, for students, pronunciation of even basically straightforward characters could be a very useful attribute. The system of the invention can be directed to a whole new range of educational applications, both hardware as well as software. Examples of the former are turnkey devices and the Chinese electronic typewriter.

With the provision of the appropriate drivers, the technology may be applied to different operating and generic systems. For users without a Chinese-enabled environment, appropriate software may be provided and incorporated into the technology. This would make the technology fully compatible with all existing environments, platforms and generic systems.

All the essential software and database may be encrypted and installed in a programmable random access memory (PRAM) temper-proof chip located in the keyboard.

The use of the keyboards illustrated is relatively easy and their use is very flexible. Many operators, after a few hours use will discover that they can find their way around the keyboard intuitively. Speed and accuracy also develop rapidly.

To facilitate recognition of the different strokes, radicals, non-radical blocks and characters on the keys, different colours may be used to distinguish representations on the individual keys. For example, the keys may show strokes, radicals, non-radical blocks and characters as follows:

a) Simple strokes—coloured red in map of the keyboard.

b) Crosses (coloured blue) which are subdivided into single crosses, double crosses, multiple crosses, upright crosses, oblique crosses, and various combinations of the last two.

c) Squares (coloured yellow) which are subdivided into squares containing horizontal strokes, squares with vertical strokes, squares with crosses, squares attached to an oblique stroke, squares attached to a single or double dots. It should be noted that a large empty square, as distinct from its small counterpart, has to be filled in with parts inside its boundaries. If the square contains nothing or the enclosed parts extend over the boundaries, it is deemed to be a small square.

d) Symmetric units (which for convenience can be coloured brown) are pairs of mirrored images, not repeated images. In this group, " " may be treated as one component or as two distinct and separate components.

e) Left, right, top, bottom and corner units can be coloured green.

f) Characters of high frequency can be coloured orange. (The colours are, of course optional and can themselves be varied.) Other features of the key functions include:

g) Each key contains two embedded characters, one in the "normal" and the other in the "shift" position. To key in a "shift" unit (can be in green typeface), the "shift key" has to be pressed and held down.

h) To use any component on a key either to input a full character thereon or to construct a character with another key or keys, just press that key. It is not necessary to take into account the other units on the key. The many parts on any key are processed in a mutually exclusive manner. When 2, 3 or 4 keys are pressed in succession, or when one key is pressed more than once, only one valid character can result.

i) Three particular units are encased in square brackets. They are [土],[日] and [七], which must be used for merging with units on the same or another key. This is to overcome the uncertainty regarding the use of 土 and 士, 日 and 日, or 七 and 匕,especially when they are a tiny part of complex characters. By placing them alongside their look-a-likes, and treating them as one and the same, the ambiguity is removed.

j) Units placed with "round" brackets can only be used with other keys for the construction of characters. If they are properties of the character set, they can be constructed in the normal way or by keying in the Chinese period mark "°" first, followed by the keys containing the units. With round brackets on the top and the bottom, the period mark "°" has to be pressed twice followed by the key containing the unit.

In an earlier reference, mention was made of the various options available for the incorporation of the English alphabet, Roman alphabet and Arabic numerals within the keyboard of the invention. It is a matter of interest that along with other useful symbols, most character sets have incorporated them. It needs to be pointed out at this stage that the primary purpose of the invention to incorporate the alphanumeric device is to allow for the transcription of foreign texts such as terms, names, and formulae. Although such a feature opens the way for interface with existing "spelling" systems and methods, it is not intended primarily for such a purpose.

The solution provided by the system of the invention is a radical departure from all the existing systems and methods. Its approach is based on the inherent nature of the Chinese character itself and the unique design of the invention. First of all and as we have pointed out earlier, Chinese characters, being all monosyllables, are homophonously inclined and tonal in nature. They may look similar or totally different from one another, or may have similar or totally different meanings. But they form natural groupings because groups of characters share the same common audio values. And within each common audio value, they fall into their four respective tonal levels. These audio and tonal values are by and large of a fixed nature, not subject to change because of contextual, syntactic and other circumstances. However, there are many exceptions. The GB character set takes full cognition of this feature. Its character code is arranged in descending order (A to F and 0 to 9) according to its audio and tonal values. Secondly, Chinese characters exist in "association". That is, a specific character always exists or are in use "in association with" another specific character or characters. The "Lian-xiang" (association of ideas) is a feature in popular Chinese word processing packages.

The keyboard and system of the invention is built on two salient features. As has been explained earlier, construction of characters is by way of units and valid combination of units. In simple terms, the process is one of "copy typing" —from memory or from a given text. In the event of wanting to know how to pronounce a certain character, the operator simply constructs the character and initiates a search. It would be a simply matter to add to the current system database and interface the audio details required to produce an audio representation of the character.

The Chinese Language Keyboard of the present invention delivers to the Chinese user features and functionality surpassing that delivered by the Qwerty keyboard to the English user. All characters are formed directly on the keyboard thereby allowing speeds in input. Its process of character formation is simple and easy to learn. All "Simplified" and "Traditional" characters can be typed directly from the keyboard. For input purposes, allowances are made for many variant forms of the same words. Users are not limited to one rigid way of typing a given word. It allows for marginal errors. Users do not need to switch manually from Chinese to English system input and back again when typing mixed texts. There are no requirements for selection of targeted words from word lists. There are no exceptions, special cases or complex rules to learn. On-screen help and function keys are provided to enable users to search for words with the same phonetic values. They can listen to the standard pronunciation of words, or have the text on the screen read. The last constructed character can be captured and brought back onto the screen. All these from the one and same "intelligent" and ultra versatile keyboard.

The specification has discussed generally the application of the invention to Chinese characters, both traditional and simplified. It is to be understood that exactly the same principles can be applied to other languages using ideographs or graphic indicea representations of the language structure. For example, the invention could easily be applied to a Japanese language system.

What is claimed is:

1. A keyboard for inputting graphical indicium representations of language characters formed from one or a combination of character units, the keyboard comprising a plurality of keys, each key having at least one unit associated therewith but with selected keys, at least, having two or more units associated therewith, the two or more units all being different and each forming at leas a part of a character, a key mapping for each key whereby selection of a key generates a mapped value of a unit associated with the selected key, the mapped value having a relational correlation with one or more relevant characters, and selection of one or more further keys which are associated with the same or other units provide further mapped values consistent with at least one of the relevant characters such that a character that is unique to the selected key or combination of keys is determined, the keys being so arranged on the keyboard that visually similar units are associated with the same of adjacent keys, and units which usually form left, right top or bottom character parts are associated with keys generally located in physically similarly related positions on the left, right, top and bottom, respectively, of the keyboard.

2. A keyboard according to claim 1 wherein each key has two character units associated therewith, one of said units being selected upon actuation of the key in normal mode and the other unit being selected upon actuation of the key in shifted mode.

3. A keyboard according to claim 2 wherein the units on each key have a common feature.

4. A keyboard according to claim 3 wherein the common feature of the units associated with each key is displayed on the respective key.

5. A keyboard according to claim 1, wherein each character unit comprises a stroke, radical, non-radical composite block or a character.

6. A keyboard according to claim 1, wherein the keys are disposed in sub-groups of one or more keys forming such sub-groups of keys, all the keys in each sub-group having at least one common characteristic.

7. A keyboard according to claim 1, wherein the keyboard is used for inputting Chinese characters and the units are units of Chinese characters.

8. A keyboard according to claim 1, wherein the keyboard has provision to provide characters, including those from a roman alphabet in addition to the units.

9. A keyboard according to claim 1 wherein the keys having visually similar units are arranged in groupings visually separated from other groupings on the keyboard.

10. A keyboard according to claim 1 wherein, in addition to the units associated with each key, selected keys also have one or two characters associated therewith such that actuation of a selected key in a first key operative mode causes the associated character to be displayed in a display screens.

11. A keyboard according to claim 10 wherein said key mapping is responsive to selected key selection to cause the display of a character to indicate in a contrasting colour additional strokes which may be added to the displayed character by a second actuation of the first selected key to construct a desired character utilising the first selected character.

12. A keyboard according to claim 10 wherein each unit and character associated with any one of the selected keys is selected according to the key mapping and the actuation of any other key in a key actuation sequence to give rise to only one character for each possible key actuation sequence.

13. A keyboard according to claim 1 wherein keys associated with the visually similar units having strokes predominantly forming an upper left corner character part are disposed at an upper, left location on the keyboard, the keys associated with the visually similar units having strokes predominantly forming an upper, right corner character part are disposed at an upper, right location on the keyboard, and the keys associated with the visually similar units having strokes predominantly forming an upper character part are disposed at an upper location on the keyboard.

14. A method of constructing graphical indicium representations of language characters formed from one or a combination of character units including the steps of:

- providing a keyboard having a plurality of keys each having a first mode of actuation and at least selected keys having a second mode of actuation, each key having at least one character unit associated therewith, at least selected keys having two or more units associated therewith, each character unit being different from each other unit, and each forming at least a part of a character to be constructed,
- arranging keys so that visually similar units are on the same or adjacent keys,
- further arranging keys so that keys associated with units which usually form left, right, top or bottom character parts are associated with keys generally located in physically similarly related positions on the left, right, top and bottom, respectively, of the keyboard
- mapping each key operational mode to a key value which is a relational correlation with one or more relevant characters,
- generating one or more character in response to a first or subsequent key actuation and constructing a character in accordance with the actuations or the sequence of key actuations.

15. A method according to claim 14 including the steps of recording the key value of the key when a key is actuated, recording the key value when a second key is actuated, and so on, the recorded values being used to search for a valid character.

16. A method as claimed in claim 14 including the steps of commencing the search for a valid character after the first key is actuated, displaying any valid character found, continuing the search and displaying any valid character as each further key is actuated until the desired character is displayed.

17. A method as claimed in claim 16 including the steps of displaying a valid character as each key is actuated and adding this to material being prepared when it is the desired character.

18. A method as claimed in claim 14 including the step of adding a displayed valid character to material being prepared by actuation of a function key.

19. A method as claimed in claim 18 wherein the function key is the space bar.

20. A method as claimed in claim 14 including the steps of adding a character to material being prepared after a predetermined maximum number of keys has been actuated.

21. A method as claimed in claim 20 wherein the maximum number is four.

22. A method as claimed in claim 14, wherein a character as displayed and any characters later printed which are based on the display are obtained from standard character sets.

23. A method as claimed in claim 14, wherein the generated character is used in a word processing operation.

24. A method as claimed in claim 14, wherein the generated character is used in a dictionary.

* * * * *